INVENTOR
JULIAN C. BAILEY
BY
ATTORNEY

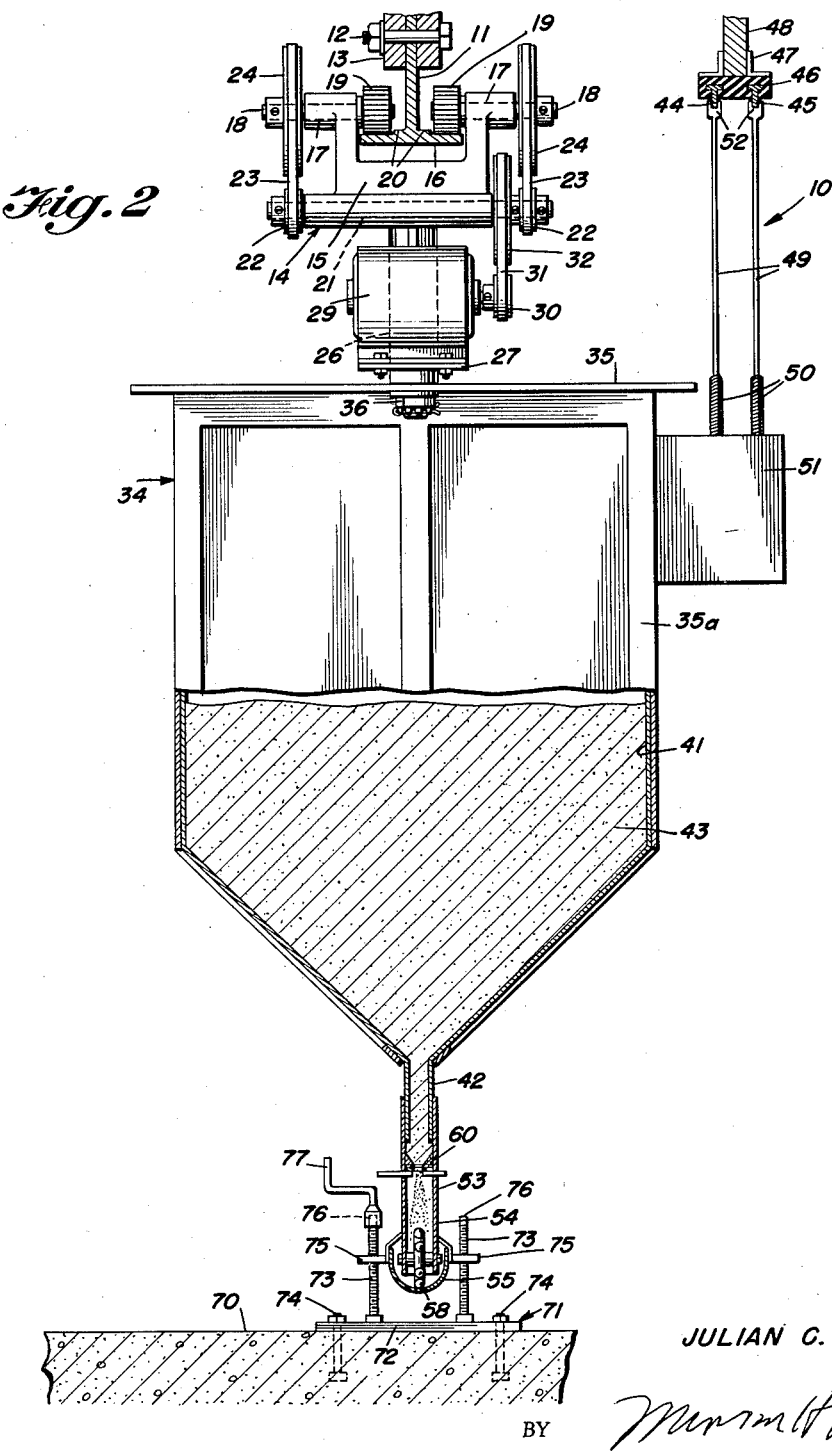

July 2, 1957   J. C. BAILEY   2,797,663
AUTOMATIC POULTRY FEEDER
Filed Oct. 4, 1956   3 Sheets-Sheet 3
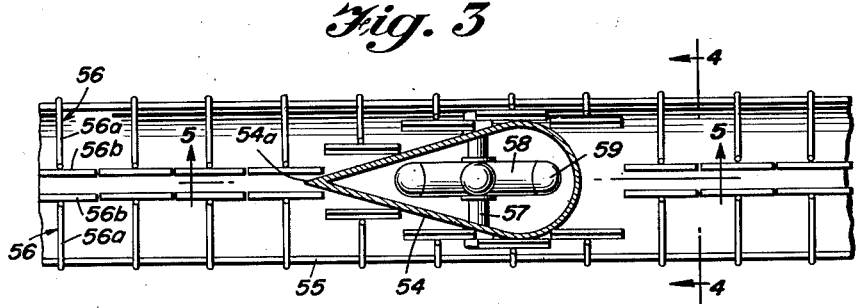
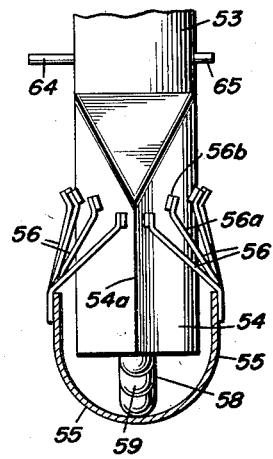
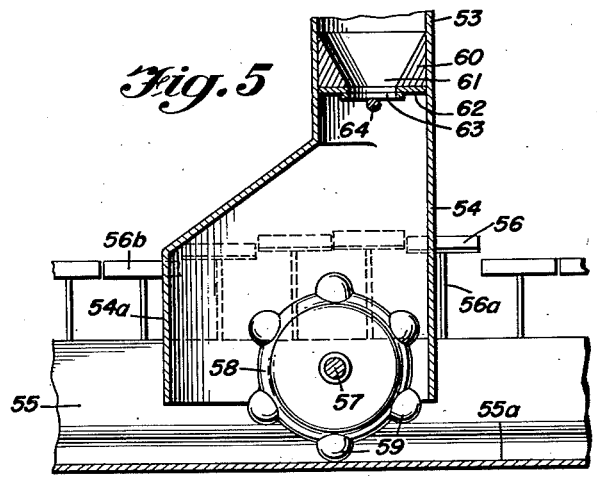
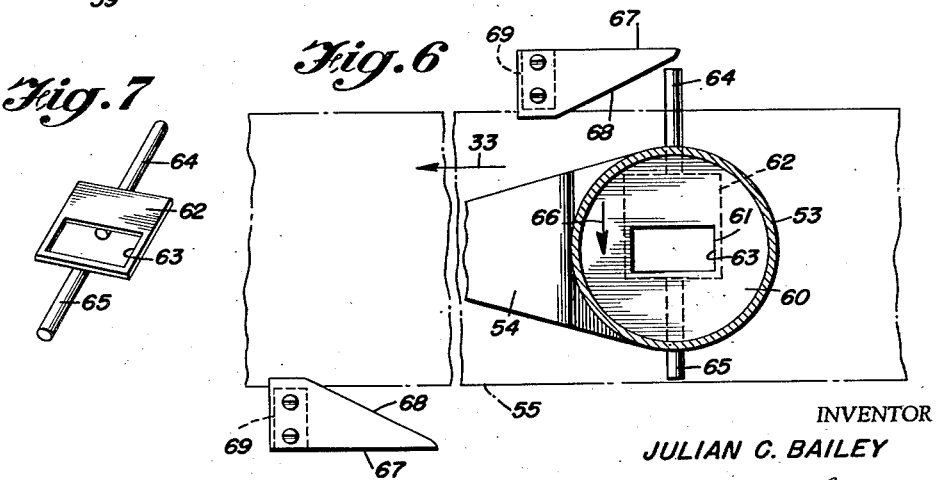
INVENTOR
JULIAN C. BAILEY
BY
ATTORNEY

United States Patent Office 2,797,663
Patented July 2, 1957

2,797,663

AUTOMATIC POULTRY FEEDER

Julian C. Bailey, Lexington, N. C., assignor of one-half to Ira M. Leonard, Sr., Lexington, N. C.

Application October 4, 1956, Serial No. 614,026

8 Claims. (Cl. 119—52)

This invention relates to new and useful improvements in automatic poultry feeders, and the principal object of the invention is to automatically and continuously deliver feed to a feed trough so that it is evenly deposited therein and replenished substantially at the same rate as it is consumed by the birds.

As such, the invention contemplates the provision of apparatus including a feed hopper suspended from a power driven carriage movable along an overhead rail, the hopper being provided at the bottom thereof with an outlet spout which is movable longitudinally in the feed trough so as to deposit the feed therein as the carriage travels along the rail.

An important feature of the invention resides in the provision of pairs of resilient guards arranged in rows at opposite sides of the trough so as to form a grill therefor to prevent the feed from being scattered by the birds, the guards in each pair being engageable with and spread apart by the outlet spout so as to facilitate passage of the latter along the trough, yet permit the guards ahead of and behind the spout to remain in their normal, grill forming position.

Another important feature of the invention resides in the provision of a rotatable guide wheel in the aforementioned spout which is adapted to travel along the bottom of the trough and to also act as an agitator for the feed discharged through the spout.

Another important feature of the invention resides in the provision of vertically adjustable means for supporting the trough so that it may be raised or lowered with respect to the spout to maintain the aforementioned guide wheel in proper engagement therewith, notwithstanding any irregularities in the ground or floor on which the trough may be mounted.

Another important feature of the invention resides in the provision of valve means in the outlet spout, and means for automatically opening and closing the valve means at predetermined points along the length of the trough.

Some of the advantages of the invention reside in its simplicity of construction, in its efficient and dependable operation, and in its adaptability to economical manufacture.

With the above more important objects and features in view and such other objects and features as may become apparent as this specification proceeds, the invention will be understood from the following description taken in conjunction with the accompanying drawings, wherein like characters of reference are employed to designate like parts, and wherein for illustrative purposes.

Figure 2 is an enlarged vertical sectional view thereof, taken substantially in the plane of the line 2—2 in Figure 1;

Figure 3 is a fragmentary horizontal sectional view on an enlarged scale, taken substantially in the plane of the line 3—3 in Figure 1;

Figure 4 is a fragmentary vertical sectional view, taken substantially in the plane of the line 4—4 in Figure 3;

Figure 5 is a fragmentary vertical sectional view, taken substantially in the plane of the line 5—5 in Figure 3;

Figure 6 is a diagrammatic view illustrating the operation of the valve means; and Figure 7 is a perspective view of the closure plate used in the valve means.

Figure 1:
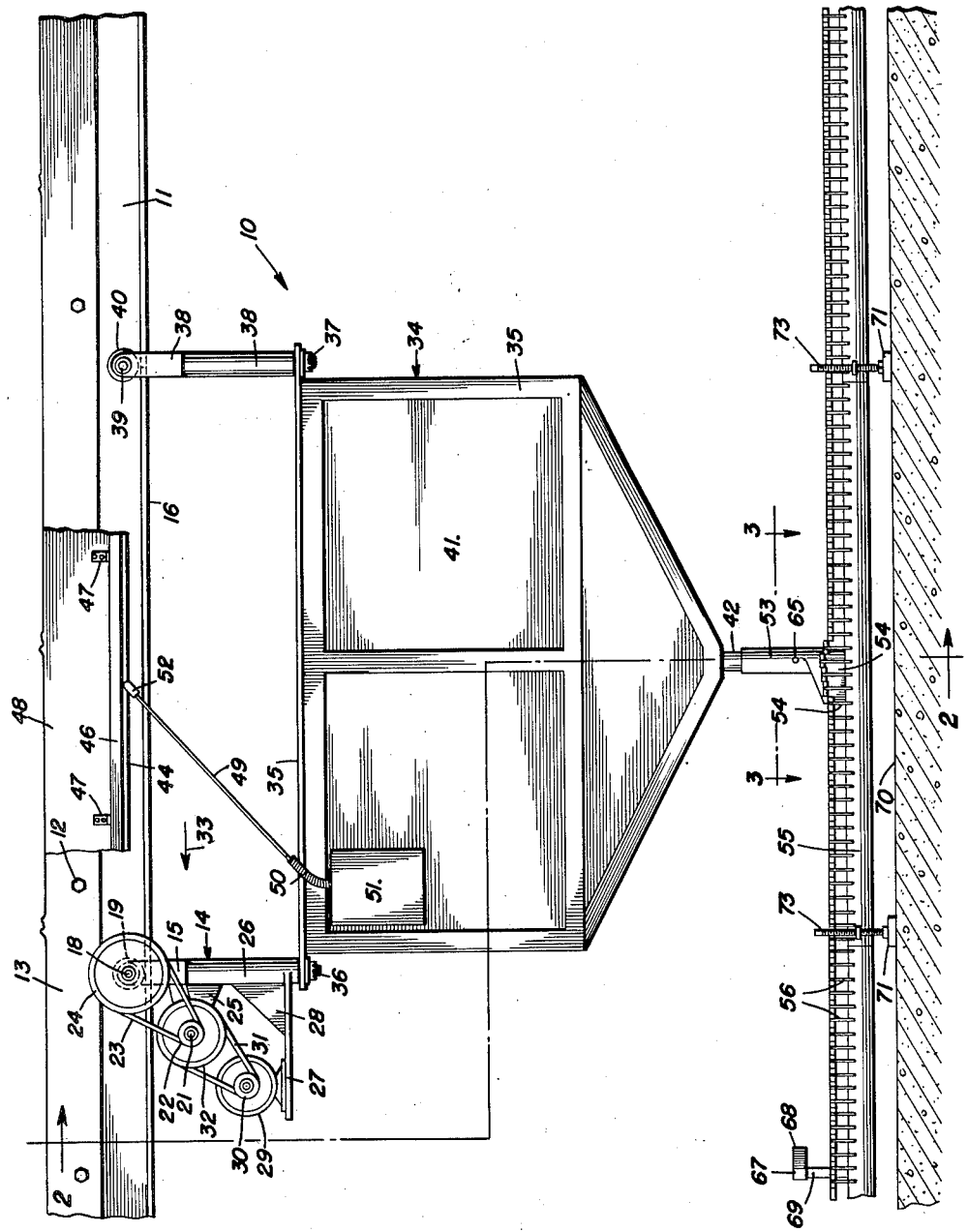
Figure 1 is a side elevational view of the invention.

Referring now to the accompanying drawings in detail, the automatic poultry feeder is designated generally by the reference numeral 10 and embodies in its construction an overhead rail 11 secured by bolts, or the like 12 from suitable overhead supporting beams 13, the rail 11 having a power driven carriage 14 movable longitudinally thereon.

The carriage 14 comprises a yoke 15 which straddles a flange 16 at the lower edge of the rail 11 and provides a pair of bearings 17 for rotatable axle 18. A pair of serrated rollers or wheels 19 are secured to the inner ends of the axles 18 for travelling along the flange 16 at opposite sides of the rail 11, it being noted that the flange is provided at opposite sides of the rail with raised shoulders 20 which are engaged by the inner faces of the rollers 19 so as to prevent the carriage from twisting or skewing on the rail.

The yoke 15 also provides a bearing for a transverse shaft 21 having a pair of pulleys 22 secured thereto, these pulleys being connected by endless belts 23 to relatively large pulleys 24 secured to the outer ends of the axles 18. The bearing for the shaft 21 is formed in a bracket member 25 which is integral with the yoke 15, and the carriage 14 also includes a substantially cylindrical depending portion 26 provided with a horizontal platform 27. A gusset 28 extends between the portion 26 and the platform 27 to reinforce the same.

An electric motor 29 is mounted on the platform 27 and has a drive pulley 30 connected by an endless belt 31 to a relatively large pulley 32 secured to the shaft 21, it being apparent from the foregoing that when the motor is in operation, the drive therefrom will be transmitted at a reduced rate of speed to the rollers 19, whereby to propel the carriage 14 along the rail 11. The direction of rotation of the motor is such as to propel the carriage in the direction of the arrow 33.

A feed hopper 34 is suspended from the carriage 14 and includes a perimetric top frame 35 having the lower end of the aforementioned carriage portion 26 attached thereto as indicated at 36. The other end of the top frame has similarly attached thereto as at 37 the lower end of a yoke 38 having a forked upper portion 38a equipped with a pair of rotatable guide rollers 40 which are mounted on suitable stub axles 39 and also travel on the flange 16 of the rail 11. If the rail 11 is straight, the points of attachment 36, 37 may be secure so that the axles 18 are always parallel with the stub axles 39. On the other hand, if the rail 11 has curved portions therein, the points of attachment 36, 37 are preferably in the form of vertical pivots, so that the carriage 14 and the yoke 38 may assume different angular relationships and permit the rollers 19 and 40 to follow the curvature of the rail.

The hopper 34 also includes a main body frame 35a supporting the hopper walls 41, while the bottom portion of the hopper is tapered and provided with a tubular outlet neck 42. The feed in the hopper is illustrated at 43.

Means are provided for delivering current to the electric motor 29 while the hopper supporting carriage means 14, 38 travel along the rail 11. These means involve the provision of a pair of spaced parallel electrified rails 44, 45 mounted in an insulating rail member 46, the latter extending substantially in parallel to the overhead rail 11 and being secured by suitable angle brackets 47 to an overhead supporting beam 48. A pair of trolley poles 49, provided at their lower ends with resilient mounts 50, are carried by a suitable housing 51 provided at one side of the hopper 34, the housing 51 accommodating junction or terminal blocks, etc. (not shown) and wiring whereby the trolley poles 49 are connected to the motor 29 for supplying current thereto. The holes 49 are equipped at their upper ends with collector shoes 52 slidable along the electrified rails 44, 45, as will be clearly apparent. The resilient mounts 50 urges the poles 49 upwardly so as to sustain the shoes 52 in proper electrical contact with the rails 44, 45.

The outlet neck 42 of the hopper 34 is provided with a tubular extension 53, the lower end portion of which is enlarged to form an elongated outlet spout 54, best shown in Figures 3–5. The spout 54 is elongated in a direction parallel to a feed trough 55 which is disposed under the overhead rail 11 in vertical alignment therewith, the mounting of the trough being hereinafter more fully described. The leading end of the spout 54 is tapered and terminates in a pointed extremity 54a, it being noted that the spout extends into the trough 55 and is movable longitudinally therein in the direction of the arrow 33, as the carriage 14 travels along the overhead rail 11.

Pairs of guards 56 are arranged in rows at opposite sides of the trough 55, the trough having an open top and the guards 56 including resilient fingers 56a having their lower ends secured to the trough and provided at their upper ends with elongated pads 56b. The resiliency of the fingers 56a is such as to normally sustain the pads 56b of each pair of guards in contact with each other, in which position the contacting guards provide what may be called a grill at the open top of the trough 54, for preventing feed in the trough from being scattered by the birds. Nevertheless, the birds may pass their necks through opening existing between the fingers 56a so as to gain limited access to the feed in the trough.

The pads 56b of the guards 56 are engageable with the sides of the spout 54 as is best shown in Figure 3 and as the spout travels along the trough, the guards 56 in each pair are progressively spread apart by the pointed extremity 54a and tapered sides of the spout, whereby passage of the spout through the successive pairs of guards is facilitated. However, it is to be observed that the guards ahead and behind the spout remain in their contacting or closed position, so as to form the aforementioned grill for preventing scattering of the feed. In other words, the guards 56 are separated by the spout only in the region where the spout is located at any particular time and are urged to their closed or contacting position by the resiliency of their fingers 56a as soon as the spout passes therebetween.

The spout 54 is provided with a transverse shaft 57 on which is mounted a rotatable guide wheel 58. The trough 55 has a concave bottom 55a and the wheel 58 is equipped at its periphery with circumferentially spaced, convex protuberances 59 which travel along the concave bottom of the trough and thereby maintain the guide wheel and the spout 54 properly centered in the trough. Moreover, the protuberances 59 on the rotating wheel 58 also serve to agitate the feed passing through the spout 54 and assist in uniform deposition of the feed in the trough. The wheel 58 is rotated, of course, by its engagement with the bottom of the trough while the carriage 14 travels along the rail 11.

Valve means are provided in the aforementioned extension 53 for controlling the flow of feed through the spout 54, these valve means comprising a block 60 secured in the extension and formed with a frusto-conical valve port 61. The latter coacts with a closure plate 62 having an opening 63 therein which is registrable with the port 61, the plate 62 being slidably disposed at the underside of the block 60 and provided at opposite sides thereof with laterally projecting extensions or pins 64, 65 which are slidable in suitable apertures formed in the opposite sides of the extension. When the plate 62 is in the position shown in Figure 6, the opening 63 therein is in register with the port 61 of the block 60, so that feed from the hopper may be discharged through the spout. However, by sliding the plate 62 in the direction of the arrow 66, the plate closes the valve port 61 and the flow of feed through the valve is stopped.

Means are provided for automatically opening and closing the valve means at predetermined points along the length of the trough 55, these means comprising blocks 67, having cam surfaces 68 and supported by suitable posts 69 at opposite sides of the trough in the particular locations where opening or closing of the valve means is to be effected. As is best shown in Figure 6, when the spout 54 travels in the direction of the arrow 33, the pin 64 is contacted by the cam surface 68 of the block 67 at one side of the trough, thus sliding the plate 62 in the direction 66 to the closed position of the valve. On the other hand, when the pin 65 contacts a block 67 at the opposite side of the trough, the plate 62 is slid to its initial position, thus opening the valve. The block 67 on the posts 69 may be movably arranged, so that they may be placed at any desired points along the length of the trough to open or close the valve means, as necessary.

The trough 55 may be mounted on any suitable supporting surface such as the ground or floor 70 by means of vertically adjustable stands 71 comprising a base plate 72 having a pair of vertical screws 73 rotatably mounted thereon. The base plate 72 of each stand is secured to the ground or floor by anchor bolts 74. The screws 73 engage screw-threaded apertures formed in pairs of laterally projecting brackets 75 secured to the sides of the trough 55 and it will be apparent from the foregoing that by simply rotating the screws 73, the trough may be lowered or raised as necessary to maintain the bottom 55a thereof in engagement with the protuberances 59 of the guide wheel 58, regardless of any irregularity in the ground or floor on which the trough is mounted.

The screws 73 are provided at their upper ends with polygonal portions 76 adapted to receive a removable hand crank 77, whereby rotation of the screws may be effected.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A mechanical poultry feeder comprising an overhead rail, a wheeled carriage movable thereon, power means for driving the wheels of said carriage, a feed hopper suspended from the carriage and having an outlet spout at the bottom thereof, valve means provided in said spout, an elongated feed trough disposed under said rail in vertical alignment therewith, said spout extending into said trough and being movable longitudinally therein, vertically adjustable means supporting said trough whereby the trough may be raised and lowered relative to said spout, pairs of resilient guards arranged in rows at opposite sides of the trough, the guards in each pair being normally in contact but being engageable with and spread apart by said spout during movement of the latter in said trough, and a rotatable agitator mounted in the lower end portion of said spout and projecting into said trough.

2. The device as defined in claim 1 wherein said power means for driving the wheels of said carriage include an electric motor mounted on the carriage, together with electrified rail means substantially parallel to said overhead rail, and current collector means operatively engaging said electrified rail means and delivering current to said motor.

3. In a mechanical poultry feeder, the combination of a feed hopper adapted for movement along an overhead rail and provided at the bottom thereof with an outlet spout, an elongated feed trough open at the top thereof and having said spout movable longitudinally therein, said spout being elongated in a direction parallel to said trough and having a pointed leading end, pairs of resilient guards arranged in rows at opposite sides of the trough, the guards in each pair normally being in contact to provide a grill for the open top of the trough but being engageable with and spread apart by said spout during movement of the latter in said trough, and a combined guide and agitating wheel rotatably mounted in said spout and engaging the bottom of said trough.

4. The device as defined in claim 3 together with valve means provided in said spout, and means provided at predetermined points along said trough for automatically opening and closing said valve means.

5. The device as defined in claim 3 together with valve means provided in said spout and including a closure plate slidable in a direction transverse of said trough, lateral extensions provided at opposite sides of said closure plate, and cam-surfaced control elements fixed at predetermined points at opposite sides of the trough, said extensions being operatively engageable with said elements whereby to slide said closure plate and automatically open and close said valve means.

6. The device as defined in claim 3 together with vertically adjustable means supporting said trough whereby the trough may be raised and lowered relative to said spout.

7. In a mechanical poultry feeder, the combination of a feed hopper adapted for movement along an overhead rail and provided at the bottom thereof with an outlet spout, an elongated feed trough open at the top thereof and having said spout movable longitudinally therein, vertically adjustable means supporting said trough whereby the same may be raised and lowered relative to the spout, and a combined guide and agitating wheel rotatably mounted in said spout and engaging the bottom of said trough.

8. The device as defined in claim 7 wherein said trough has a concave bottom, together with convex protuberances provided at circumferentially spaced points on said wheel in engagement with the concave bottom of the trough.

References Cited in the file of this patent
UNITED STATES PATENTS

| | | |
|---|---|---|
| 2,601,057 | Roberts et al. | June 17, 1952 |
| 2,652,808 | Wagner | Sept. 22, 1953 |